United States Patent

Becker

[11] 4,040,646
[45] Aug. 9, 1977

[54] SAFETY STEERING COLUMN WITH A DEFORMING ELEMENT

[75] Inventor: Burckhard Becker, Solingen-Widdert, Germany

[73] Assignee: Volkswagenwerk Aktiengesellschaft, Wolfsburg, Germany

[21] Appl. No.: 624,925

[22] Filed: Oct. 22, 1975

[30] Foreign Application Priority Data

Nov. 30, 1974 Germany .............................. 2456794

[51] Int. Cl.² ............................................... B62D 1/18
[52] U.S. Cl. ....................................... 280/750; 74/492
[58] Field of Search ............... 280/750, 752; 188/1 C; 74/492

[56] References Cited

U.S. PATENT DOCUMENTS

| 3,468,182 | 9/1969 | Shwartzberg | 188/1 C |
| 3,468,183 | 9/1969 | Shwartzberg | 74/492 |
| 3,717,223 | 2/1973 | Alfes | 188/1 C |
| 3,934,486 | 1/1976 | Becker | 74/492 |
| 3,934,897 | 1/1976 | Moos | 74/492 |

FOREIGN PATENT DOCUMENTS

| 1,303,280 | 6/1971 | Germany | 74/492 |
| 2,160,849 | 12/1971 | Germany | 74/492 |

*Primary Examiner*—Robert R. Song
*Attorney, Agent, or Firm*—Brumbaugh, Graves, Donohue & Raymond

[57] ABSTRACT

A safety steering column has a deforming element inserted between parts of the steering column extending between a steering wheel and steering gear in a vehicle. The deforming element is fabricated from a torsionally rigid, flat piece of material, and has a longitudinal cross-section generally of zig-zag shape, such as a Z or an M. The element connects the steering column parts with torsional rigidity and is responsive to percussive forces occurring in the direction of a steering column axis. The magnitude of the transverse extension of the element in a direction normal to the steering column axis is at least twice the diametral magnitude of the steering column parts.

3 Claims, 3 Drawing Figures

SAFETY STEERING COLUMN WITH A DEFORMING ELEMENT

BACKGROUND OF THE INVENTION

The invention relates to a safety steering column having a deforming element inserted between parts of the steering column extending between a steering wheel and steering gear in a vehicle for preventing injury to a driver of the vehicle in a frontal collision. The deforming element absorbs impact energy applied to the steering column to prevent the steering wheel part of the steering column from being displaced toward the driver by intercepting the thrust of the steering gear part of the steering column, and/or absorbs the impact energy of the driver upon the steering wheel by deformably yielding under load.

A steering column of this kind is disclosed in German Pat. No. 1,303,280 (63c, 47), in which the deforming element is a long corrugated tube. However, this known device is of complicated manufacture, and furthermore, inasmuch as the tube is fabricated of comparatively thin metal plate for resilience, producing durable welds between the flanged ends of the tubular deforming element and the respective correspondingly shaped ends of the adjoining steering column parts has proven to be difficult.

Another known device, shown in German Instrument of Disclosure No. 2,160,849 (63c, 47), utilizes a deforming element integrated with the steering column and consisting of depressions offset and on opposite sides of the steering column axis, such that at pertinent points the steering column has a flat, instead of round, cross-section. This structural arrangement both excludes use of a steering column consisting of solid material and, in addition, offers only a very limited possibility of energy dissipation through deformation in that, in the zones of the individual depressions, only very short deformation paths are available, though requiring comparatively large deformation forces.

It is therefore a principal purpose of invention to create a safety steering column having a deforming element which can be produced simply and inexpensively, and which can be securely connected with the adjoining steering column parts in a simple and conventional manner, while at the same time offering the advantages of a relatively large deformation path and adaptability to a desired deformation force.

SUMMARY OF THE INVENTION

In accordance with the invention, a safety steering column has at least one deforming element inserted between a steering column part connected to the steering gear mechanism and another steering column part mounting the steering wheel for the vehicle, the deforming element connecting the steering column parts in a torsionally rigid manner and being responsive to percussive forces occurring in the direction of the steering column axis. The improvement resides in that the deforming element is fabricated from a flat piece of material and has a longitudinal cross-section generally of zig-zag shape, such as a Z or an M, wherein the magnitude of the transverse extension of the element in a direction normal to the steering column axis is at least double the magnitude of the diameter of the steering column parts.

The advantages of a long deformation path and of adaptability to a desired deformation force are obtained by properly dimensioning the flat piece of material used to form the element, and/or by selecting the angle formed by an intermediate leg of the Z- or M-shaped element in relation to the longitudinal axis of the steering column, and/or by correspondingly providing a proper magnitude of transverse extention and length of the deforming element.

Due to the construction provided for, as opposed to the one described in the aforementioned German Instrument of Disclosure, the deforming element of the present invention is formed as an additional part fabricated from a flat piece of material, not by stiffening corrugations in the material of the steering column proper, and therefore the steering column itself may consist of solid material. Furthermore, the individual legs of the Z- or M-shaped element may be dimensioned of sufficient length such that the points at which they are joined together, i.e. the bends in the element, are space far from the area of cross-section between parts of the steering column proper. This latter construction results in a large moment of torque or leverage being applied to the bends in the element upon impact such that, despite a relatively large material cross-section of the element and a resultant high torsion-resisting capacity connected therewith, the desired deformation occurs readily upon application of a comparatively small deformation force. In addition, it is possible to transmit torque to the steering gear mechanism by way of the steering column even after extensive deformation of the element. Fastening the ends of the deforming element to the adjoining surfaces of the steering column parts by welding can also be facilitated by selection of a suitable cross-section for the flat piece of material.

The essential features and further advantages of the present invention are discussed in greater detail below, in conjunction with the drawings, of which:

DETAILED DESCRIPTION

Figure 1:
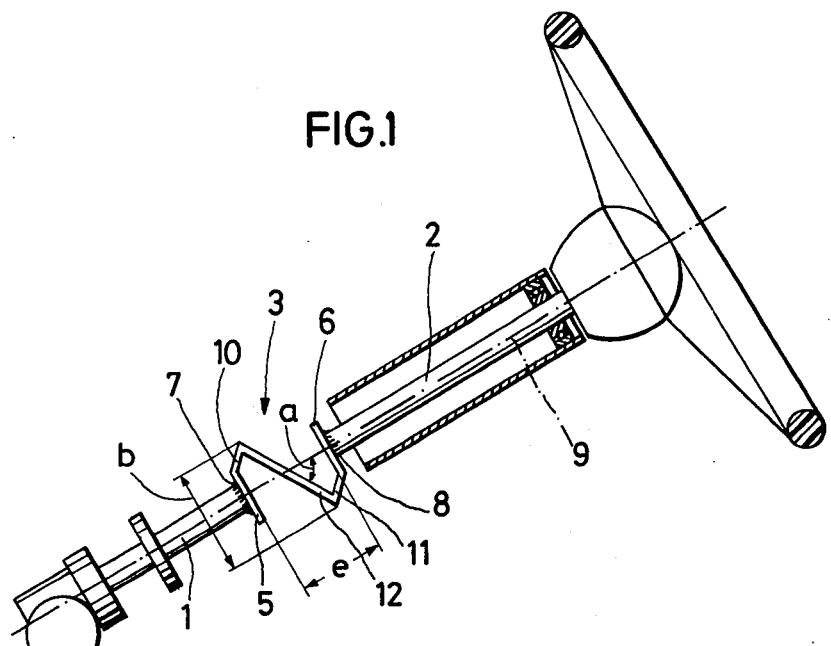
FIG. 1 is a sectional view of a safety steering column assembly having a Z-shaped deforming element according to the invention.

In FIG. 1, a steering column extends between a steering wheel and steering gear mechanism for a vehicle. The column includes a column part 1 on the steering gear side, a column part 2 on the steering wheel side, and a deforming element 3 inserted between and connecting the column parts. Although not shown in the drawing, universal joints and further deforming elements may be inserted elsewhere in the steering column, as is conventionally understood in steering column art.

The deforming element 3 is shown having an approximately Z-shaped longitudinal cross-section and includes two end legs 5 and 6 which are secured by means of weld 7 and 8 to the adjoining surfaces on the ends of the steering column parts 1 and 2. The end legs 5 and 6 continue into respective inclined legs 10 and 11, which are angled with respect to both the end legs 5 and 6 and the steering column axis 9, and the inclined legs 10 and 11 both extend into the intermediate leg 12 to form the deforming element.

In a preferred embodiment of the invention, the intermediate leg 12 forms an angle $a$ of approximately 60° in relation to the steering column axis 9. This angle $a$ together with the magnitude of the transverse extension $b$ of the element 3 in a direction normal to the steering column axis determines the length e of the element. As illustrated in FIG. 1, the magnitude of the transverse extension b from bend to bend on opposite sides of the steering column axis is considerably, and at least twice, larger than the diameter of the steering column parts 1 and 2, so that even if the element 3 has a comparatively large cross-section for torsionally rigidity, the desired deformation and impact energy absorption will nonetheless be obtained due to the large moment of torque or leverage being applied to the bends in the legs of the element.

Figure 2:
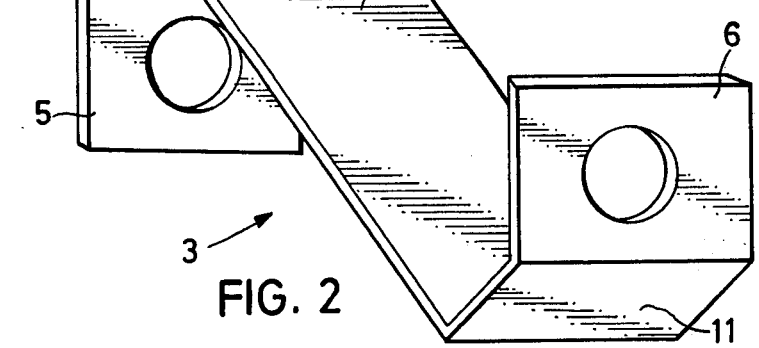
FIG. 2 shows the deforming element of FIG. 1 in perspective.

Due to the symmetry of the Z-shaped deforming element in the preferred embodiment of the invention, shown in perspective in FIG. 2, the general coaxial alignment of the steering column parts 1 and 2 is maintained even on impact, the parts approaching each other until the end and intermediate legs 5, 6, and 12, respectively, of the element are superposed. With this configuration, it is thus possible to transmit torque from the steering wheel to the steering gear mechanism even after deformation has occurred.

Figure 3:
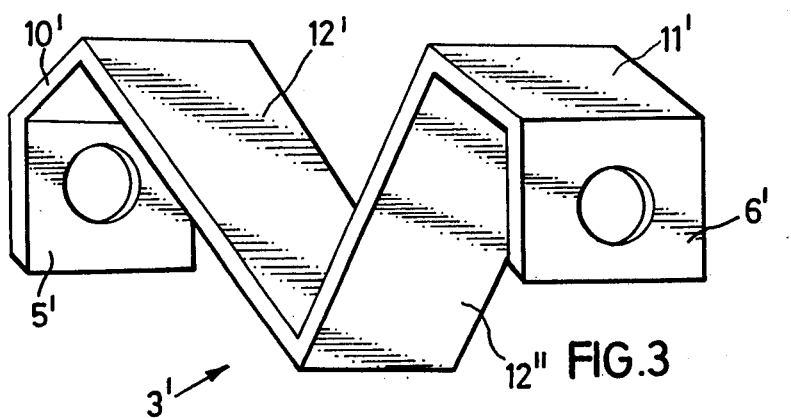
FIG. 3 shows an M-shaped deforming element according to the invention, in perspective.

In another embodiment of the invention, shown in FIG. 3, an M-shaped deforming element 3' has end legs 5' and 6' continuing into inclined legs 10' and 11' which extend into intermediate legs 12' and 12". Like the Z-shaped embodiment, this arrangement is dimensioned to permit deformation even when the element 3' has a comparatively large cross-section and the symmetry of form preserves the coaxial alignment of the column parts joined to the element.

As can be seen, the present invention lends itself to the possibilities of simple and inexpensive production, in that the deforming element may be formed an easily workable, flat, rectangular piece of material, of convenient and secure connection between the element and adjoining ends of the steering column parts, as well as of appraisable dissipation of forces on impact which can be adjusted through the proper dimensioning of the deforming element.

It will be understood that the above described embodiment is merely exemplary and that those skilled in the art may make many variations and modifications without departing from the spirit and scope of the invention. All such modifications and variations are intended to be within the scope of the invention as defined in the appended claims.

I claim:

1. In a safety steering column of the type having a deforming element inserted between a first steering column part connected to a steering gear mechanism for a vehicle and a second steering column part coaxial with the first and mounting a steering wheel for the vehicle, said deforming element connecting the steering column parts in a torsionally rigid manner and being responsive to impact forces occurring in the direction of the steering column axis, the improvement wherein the deforming element is formed from a flat rectangular piece of material which is bent widthwise so as to have a zig-zag longitudinal cross-section generally in the shape of a Z or M, said bends in the element symmetrically defining end legs normal to the steering column axis which are welded to adjoining surfaces of the respective steering column parts, inclined legs continuing obliquely from the end legs, and at least one intermediate leg connecting the inclined legs and intersecting the steering column axis at an acute angle thereto, and wherein the length of the at least one intermediate leg in relation to the other legs of the element, the transverse extension of the element from bend to bend on opposite sides of the steering column axis, and the angle of the at least one intermediate leg to the steering column axis are selected such that the element has both a long deformation path and the property of symmetrical deformation in which the steering column parts move toward each other and remain substantially coaxial upon application of impact forces on the steering column.

2. The safety steering column described in claim 1, wherein the transverse extension of the deforming element is at least twice the diametral magnitude of the steering column parts.

3. The safety steering column described in claim 1, wherein the angle of the at least one intermediate leg to the steering column axis is approximately 60°.

* * * * *